Patented Jan. 9, 1923.

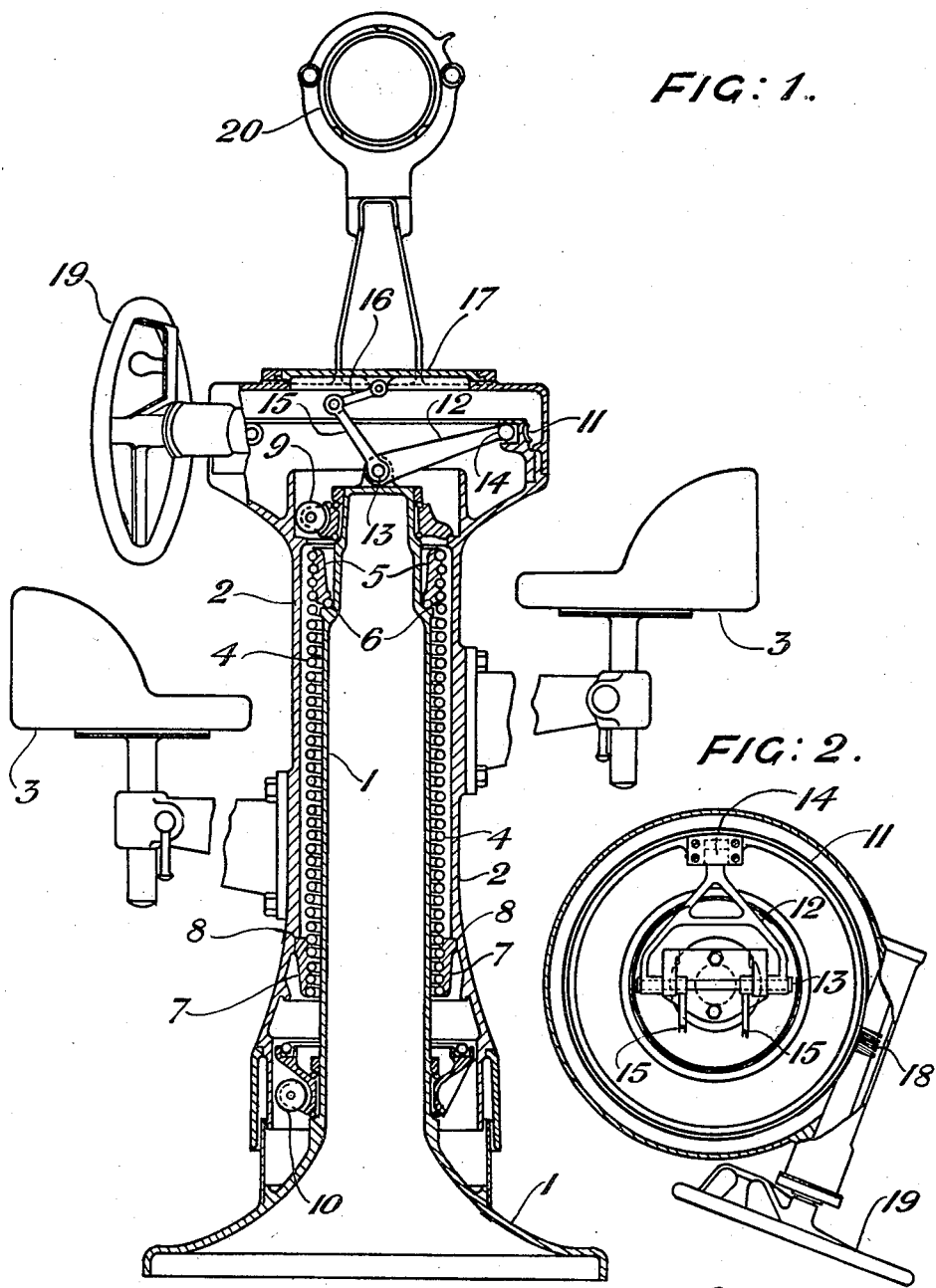

1,441,477

UNITED STATES PATENT OFFICE.

ARCHIBALD BARR AND WILLIAM STROUD, OF GLASGOW, SCOTLAND, ASSIGNORS TO BARR AND STROUD, LIMITED, OF GLASGOW, SCOTLAND.

MOUNTING FOR THE SUPPORT OF INSTRUMENTS ON BOARD SHIP.

Application filed August 16, 1921. Serial No. 492,869.

(GRANTED UNDER THE PROVISIONS OF THE ACT OF MARCH 3, 1921, 41 STAT. L., 1313.)

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Mountings for the Support of Instruments on Board Ship (for which I have filed an application in England, dated Nov. 4, 1918, Patent Number 134,339), of which the following is a specification.

Our invention relates to improvements in mountings for the support of instruments such as rangefinders, telescopes, searchlights, etc., on board ship.

The essential condition to be satisfied in the method of support which we adopt, and which in itself is known, is that when the part carrying the instrument is displaced vertically downwards with reference to the deck, the force operating upon it so as to raise it, will suffer little or no alteration in magnitude in other words the force remains practically constant. For this condition to be satisfied by a metallic spring the distortion of the spring accompanying a linear motion equal to the amplitude of the vibration of the deck of the ship, must be small compared with the total distortion of the spring from its natural form. The mounting according to this invention comprises a pedestal that may be carried from the deck or other part of the ship, and an anti-vibrationally supported part, hereinafter referred to generally as the sleeve, which is guided from the pedestal, movable vertically relatively to the pedestal within a limited range, and which carries the instrument and the man or men using it. A downward motion of the sleeve is resisted by the tension or compression of a helical spring or springs arranged concentrically with the pedestal. The spring is so designed that when the instrument and the man (or men) are in place, the sleeve is not at either end of its travel. The spring is long compared with the range of motion of the sleeve and so designed that the period of free vibration of the sleeve, and the parts it carries, under the action of the spring is long compared with the period of the vibrations it is intended to counteract. In some cases, we use two or more helical springs interwound, and when used in tension these may be so made that when the anti-vibration portion is not fully loaded the the springs, by their tension, bear tightly upon each other so that considerable load is needed to make the springs begin to open. The sleeve may be guided in its longitudinal motion relatively to the pedestal by means of rollers and when the sleeve has to rotate relatively to the pedestal ball bearings may be introduced between the roller carriages and the pedestal (or the sleeve) and also between the spring and the pedestal (or the sleeve) so that little torque is communicated to the spring by the rotation of the sleeve.

When some part of the mounting has to be controlled azimuthally relatively to the pedestal and yet moved vertically with the sleeve, we may provide a link or links between the parts that will offer little frictional resistance to the vertical motion of the sleeve relatively to the pedestal. Again, in some cases, we may use a connecting piece attached to one part—say that carried on the sleeve—and feathered into the other part—say the pedestal—so that vertical motion is little constrained but relative rotational motion is prevented. The former means of constraint may, for example, be used when a worm wheel gear is needed to effect relative rotation of the sleeve and pedestal and considerable forces may have to be communicated, and we may use the latter method, for example, to control a dial, carried from the sleeve, rotationally relatively to the pedestal.

A platform or platforms consisting, say, of seats and footrests may be carried on the sleeve for use by the operator, or operators, on the anti-vibration portion of the mounting.

An example of construction will now be described with reference to the accompanying drawing, in which:—

Figure 1 is a sectional elevation of the mounting and Figure 2 is a sectional plan of an upper part of the mounting.

In the drawing 1 represents the pedestal fixed to the deck, 2 the sleeve to which is fixed the seats 3. The weight of the sleeve and the observer is supported by the helical spring 4 in the following manner:—The upper end of the spring is screwed onto a nut 5 which is mounted upon a ball race 6 so that this end can revolve if necessary relatively to the pedestal. Similarly, the lower end is screwed into a nut 7 which supports the whole weight of the sleeve and observers, the sleeve 2 being formed with a circular step which rests at 8 on the top of the nut 7. The vertical motion of the sleeve is made as frictionless as possible by means of three rollers 9 at the top and by three similar rollers 10 at the bottom, of which only one of each is shown.

11 shows the worm wheel fixed rotationally with reference to the pedestal but capable of a limited vertical movement. The fixation rotationally is accomplished by means of the radial arm 12, mounted upon a spindle 13 whose axis is fixed to the pedestal. The outer end 14 of this arm engages with the inside of the worm wheel 11.

In a similar fashion by means of the linked arms 15 and 16, the azimuth scale 17 is prevented from rotating in azimuth with reference to the pedestal.

The hand wheel 19 is used to drive the worm 18, gearing with worm wheel 11 which is fixed relatively to the pedestal, and thereby the observer or observers together with the instrument, say, a rangefinder, 20, can be moved in azimuth.

We claim:—

1. An anti-vibration mounting for use on shipboard comprising, a pedestal fixed to the deck of the ship, a sleeve concentric with the axis of the pedestal and capable of azimuthal and axial movement relatively to the pedestal, a carrier fixed to the sleeve for supporting an instrument, a platform (or platforms) fixed to the sleeve for supporting an observer (or observers), a helical spring supporting the sleeve and its load from the pedestal, and hand operated gear for rotating the sleeve relatively to the pedestal, for the purposes set forth.

2. An anti-vibration mounting for use on shipboard comprising, a pedestal fixed to the deck of the ship, a sleeve capable of azimuthal and axial movement relatively to the pedestal, a carrier fixed to the sleeve for supporting an instrument, a platform (or platforms) fixed to the sleeve for supporting an observer (or observers), a helical spring supporting the sleeve and its load by tension from the pedestal, and hand operated gear for rotating the sleeve relatively to the pedestal, for the purposes set forth.

3. An anti-vibration mounting for use on shipboard comprising a pedestal fixed to the deck of the ship, a sleeve capable of azimuthal and axial movement relatively to the pedestal, a carrier fixed to the sleeve for supporting an instrument, a platform (or platforms) fixed to the sleeve for supporting an observer (or observers) a helical spring tightly wound supporting the sleeve and its load by tension from the pedestal, and hand operated gear for rotating the sleeve relatively to the pedestal, for the purposes set forth.

4. An anti-vibration mountintg for use on shipboard comprising, a pedestal fixed to to the deck of the ship, a sleeve concentric with the axis of the pedestal and capable of azimuthal and axial movement relatively to the pedestal, a carrier fixed to the sleeve for supporting an optical instrument, a platform (or platforms) fixed to the sleeve for supporting an observer (or observers), a helical spring supporting the sleeve and its load on the pedestal, hand operated gear for rotating the sleeve relatively to the pedestal, and a part controlled azimuthally by the pedestal and mounted capable of axial movement with the sleeve relatively to the pedestal, for the purposes set forth.

ARCHIBALD BARR.
WILLIAM STROUD.